United States Patent
Das

(10) Patent No.: US 6,950,209 B1
(45) Date of Patent: Sep. 27, 2005

(54) GENERATING KNOCKOUT MARKS FOR OBJECTS

(75) Inventor: Sujata Das, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/499,248

(22) Filed: Feb. 7, 2000

(51) Int. Cl.[7] .......................... G06F 13/00; G06F 15/00
(52) U.S. Cl. ...................................... 358/3.01; 382/162
(58) Field of Search ............................. 358/1.15, 3.01; 715/526, 527, 528; 345/589, 590, 591, 619, 345/620, 621, 622, 623, 624, 625, 626, 627, 345/628; 382/162

(56) References Cited

U.S. PATENT DOCUMENTS

| | | | | |
|---|---|---|---|---|
| 5,295,236 A | * | 3/1994 | Bjorge et al. ............... | 715/527 |
| 5,438,653 A | * | 8/1995 | Boenke et al. ............... | 345/592 |
| 6,049,390 A | * | 4/2000 | Notredame et al. ......... | 358/1.15 |
| 6,141,012 A | * | 10/2000 | Bollman et al. ............. | 345/418 |
| 6,236,410 B1 | * | 5/2001 | Politis et al. ................ | 345/440 |
| 6,330,072 B1 | * | 12/2001 | Barada et al. ............... | 358/1.18 |
| 6,381,032 B1 | * | 4/2002 | Laverty et al. .............. | 358/1.15 |
| 6,594,030 B1 | * | 7/2003 | Ahlstrom et al. ........... | 358/1.15 |
| 6,693,719 B1 | * | 2/2004 | Gupta et al. ................. | 358/1.15 |

* cited by examiner

*Primary Examiner*—Edward Coles
*Assistant Examiner*—Alan Rahimi
(74) *Attorney, Agent, or Firm*—Fish & Richardson P.C.

(57) ABSTRACT

A host-based method for identifying an area within a color layer of a page that is not to be painted when producing a final output page. The method includes identifying an object that is to be overprinted and has a color definition that specifies color data for less than all of the color layers in the page, generating a knockout object associated with the identified object and appending the knockout object to the page.

18 Claims, 2 Drawing Sheets

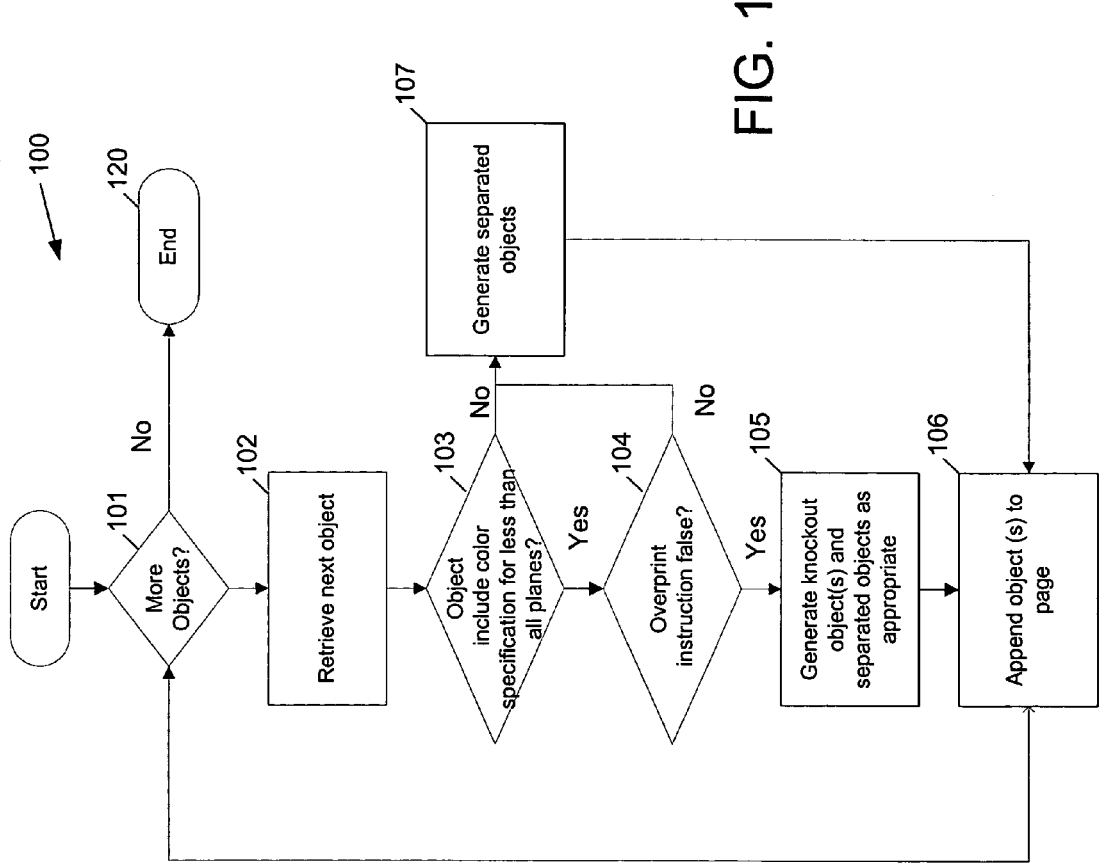

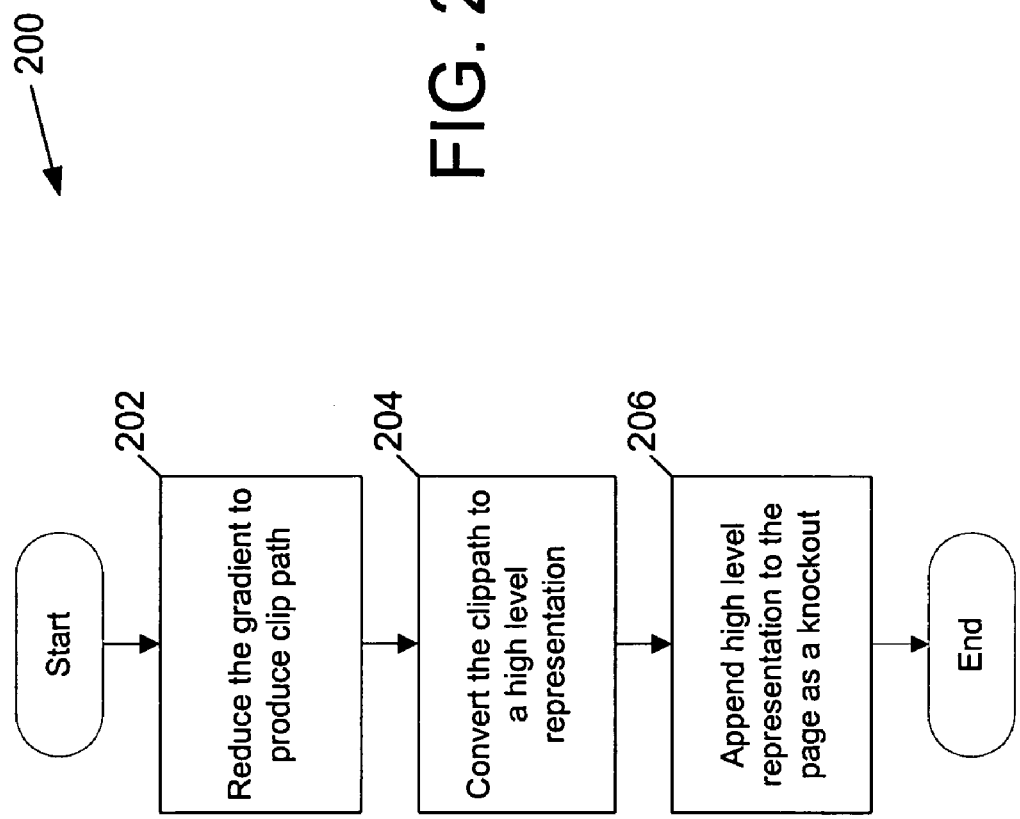

GENERATING KNOCKOUT MARKS FOR OBJECTS

BACKGROUND

The present invention relates generally to computing systems and more particularly to a method and apparatus for representing a document to be displayed on an output device.

A document publishing application can be used to produce content (i.e., a document) to be displayed on an output device. Document publishing applications allow a user to manipulate text, graphics, image and other data, forming a document for publication on a conventional output device. The output can be described in terms of one or more page description language objects that can be processed by the output device. The output device can include a raster image processor for translating the page description language objects into data for display on the output device.

Conventional document publishing applications can produce output in one of a plurality of output formats. Depending on the format type, various other devices can view or manipulate the output. As described above, the document produced by a conventional document publishing application can include one or more pages of content, each described in a page description language. Two well known page description languages for specifying objects and related information are the PostScript® and the Portable Document Format™ (PDF™) by Adobe Systems, Inc. of San Jose, Calif.

Herein, a "page" of displayed data refers to a block or group of visual representations that can be viewed by the user as a unit. For example, a page of displayed representations from a printer device can be the representations shown on a single sheet of paper (or more sheets, if a page is defined to span multiple sheets of paper). In page description interpreters such as the PostScript interpreter, a page of data is typically interpreted, processed and sent to an output display device before the next page is processed.

Each page can include instructions for specifying one or more objects to be painted on the page including specifying colors for the objects. The color specification can include data for one or more color planes as well as the designation of one or more non-process color planes. That is, the color specification can include data values for a subset of the color planes defined in the page and overprint instructions.

The color specification for an object can designate a color space that is divided into plural color planes. The gamut for the color space defines all the possible colors able to be generated in the color space. In some applications, a user can specify one or more particular colors, a spot color(s), within the gamut. A spot color can be defined for a frequently used color in the document. Alternatively, a user can designate a color as a spot color where there is a need to preserve the color through the printing process, e.g., maybe a fluorescent color. When specifying a spot color, the document publication application can create a spot color plane to be associated with the object. That is, the color specification for the object can include data for the spot color plane as well as the other planes associated with the color space defined for the object.

As described above, the object color specification can include overprint instructions. In general, PostScript and PDF documents include implicit overprint instructions. That is, the page description includes one or more operators for defining marks on a page. Each new mark completely obscures any marks it may overlay. In addition, objects may include explicit overprint instructions. For example, a PDF gradient can include an explicit overprint instruction as part of the object definition.

When processing a document, a conventional color output device includes a color separation system. The color separation system separates a page into its component color planes, and produces as an output plural "gray" pages, one for each color plane, to be used in marking the page. A "gray" page is a representation of the page in a single color plane and includes only color data for the single color plane. Each object processed by the color separation system may require the generation of color separations for marks made in select color planes and the removal of marks in corresponding positions of unselected planes.

In a conventional output device, the color separation function is performed by a rasterizer. When an object is marked (e.g., color data is specified for the object in one or more color planes), the rasterizer sets the pixel values in the various planes to certain values. When color data is specified for less than all the planes, the rasterizer sets the corresponding pixels in the "unmarked" planes to the background color.

SUMMARY

The present invention provides a host-based method for identifying an area within a color layer of a page that is not to be painted when producing a final output page. The page includes a gradient having a color definition having color data for less than all of the color planes. The method includes defining a clippath for the gradient, converting the clippath to a high level representation and adding the high level representation of the converted clippath back to the page as a knockout area that is not to be painted.

Aspects of the invention can include one or more of the following features. The step of defining the clippath can include reducing the gradient to simple objects and identifying he set of simple objects that bound the gradient. The high level representation can be a path object. The path object can be a PDF path object. The step of converting can include converting the clippath to a PDF path object. The page can be represented in PDF and the step of adding can add the PDF path object identifying the knockout area to the PDF representation of the page.

In another aspect, the invention provides a host-based method for identifying an area within a color layer of a page that is not to be painted when producing a final output page. The method includes identifying an object that is to be overprinted and has a color definition that specifies color data for less than all of the color layers in the page, generating a knockout object associated with the identified object for all non-process color layers and appending the knockout object(s) to the page.

Aspects of the invention can include one or more of the following features. The page can be a separated page and the knockout object can be added to a location in a marking list for the separated page at a same location as the identified object in a marking list for the page. The step of appending the knockout object to the page can append the knockout object in a marking list for the page immediately after or before the identified object.

Aspects of the invention can include one or more of the following advantages. A host-based system is provided for identifying an area within a color layer of a page that is not to be painted. The system is configured to produce a high level representation of the area not to be painted and adds this high level representation to the page to produce a high level representation of a knockout area that is not to be painted when the page is subsequently printed by an output device. A mechanism is provided for separating out the path information associated with a gradient and assigning to it a no color representation that can be used when rendering the object on an output device. The high level representation is added to the original page and allows for the ready portability of the document to a variety of output devices.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1 shows a host-based method for generating knockout objects for a page.

FIG. 2 shows a host-based method for generating knockout objects for a gradient.

Like reference symbols in the various drawings indicate like elements.

DETAILED DESCRIPTION

Referring now to FIG. 1, a host-based process 100 for identifying an area within a color layer of a page that is not to be painted when producing a final output image is shown. The page can be produced by a document publication application. Examples of document publishing applications include Illustrator™ by Adobe Systems, Inc, of San Jose, Calif.

The document publication application produces as an output a page that can be described by a page description language (PDL). The PDL description includes one or more objects that specify data values for less than all of the color planes of a proposed output device. Each object may also include explicit or implicit overprint instructions. In one implementation, the page is operated on by a separation process to produce separated pages, one for each color separation defined for the output device on which the original page is to be printed or displayed. In the separation process, each of the objects on a page is evaluated in the order that they are marked and either a knockout or a separated object is added to the end of each of the separated pages as described below.

A knockout is an area or object within a color layer that is not to be painted. Knockouts are required when processing certain types of objects, one example of which is a PDF gradient (hereinafter referred to as a "gradient"). A gradient has a complex geometry and defines a shading for an object. The definition can also include overprint instructions. If included, the method generates a knockout object that identifies the area and the color planes that are not to be painted in the final rendered image. In a PDF compatible system, the knockout object is processed after all other objects for a page have been processed, producing the desired overprint results. A knockout object defines exactly what should be done in the "unselected" color planes for an associated object.

More specifically, the process begins by checking to see if more objects for the page are to be processed 101. If no more objects remain, the process ends 120, else the next object is retrieved 102. A check is made to determine if the object includes a color specification for less than all of the separation planes 103. If the color definition includes data for all planes, the process continues at step 107 where separated objects are generated. If the color definition includes non-process planes (i.e., planes where not color data is specified), then a check is made to determine if the object is to be overprinted (104). Some objects will include specific overprint instructions indicating that one or more of the separation planes are to be overprinted rather than let the "background" color show through. Other objects color specification will include color data for less than all of the separation planes, and an implicit overprint instruction may be evaluated. In PDF, the default or implicit overprint instruction is set to false (i.e., the object should be overprinted rather than be blended with the background). If the object is to be overprinted, the process generates separated objects for each process color plane and a knockout object for the identified object for each non-process color plane 105. By process, we refer to each color plane that includes specified color data for a given object. By non-process, we refer to each color plane where no color data is specified for a given object. A knockout object is created for each color separation that is to be overprinted in the final output.

Each knockout object and separated object is appended to a respective separation page 106 and the process continues at step 101. When all of the objects for the page have been evaluated, the process ends and the separated pages can be transmitted to an output device for printing or display. Each separated page includes one or more specified separate objects and knockout objects as appropriate to specify areas of the separated page that are not to be painted in a particular color separation.

In one implementation, knockout objects are produced and appended to the original PDL representation of the page producing a composite page. In this implementation, each object is processed, but separation data is not produced (i.e., no separation pages are produced). Instead, the host invokes a knockout process to evaluate each object, produce knockout objects as appropriate and add the knockout objects to the marking list for the page to produce a composite page. Each object is processed in marking order for the page. When an object that includes a color specification for less than all of the color planes is processed and overprint is specified, knockout objects for the identified object are created and added to the original page in the accordance with the original ordering of the page. That is, the knockout objects are added to the page at the same relative location as the original object that gave rise to their creation. Knockout objects can be added to the list of marking objects for the page immediately after the currently processed object and before a next object that is to be processed in the page. Alternatively, knockout objects can be added to the list of marking objects for the page immediately before the currently processed object in the marking list. In one implementation, where plural knockout objects are generated in association with a single object in the page, the ordering of the knockout objects in the marking list does not matter. The generation of a composite page allows the underlying page to be viewed on any simplistic output device that is configured to always overprint.

In one implementation, the process for generating a knockout object includes generating a path and a color definition for the knockout object. The path is derived from the original object. The color definition is also derived from the original object, in that, any unselected planes in the original object are designated as no-color planes in the knockout object. That is, the knockout object is assigned a null data value in each color plane that is unselected in the original object. For example, if the original object only specified color in a single color plane, the knockout object would include a specification of no-color to be used in all the remaining color planes. The knockout objects, which are appended to the page description, ensure that when their associated objects are painted, the specified color planes in the original objects will overprint any unselected color planes.

A PDF gradient object includes a path and color definition that are joined in a single object. The PDF gradient can be described by a PDF Type 2 pattern dictionary. The pattern dictionary includes a sub-dictionary that defines the color transition to be used. In order to determine a knockout object, a path for the object must be determined. Referring now to FIG. 2, a host-based method 200 for processing a PDF gradient to produce a knockout is shown.

The method includes partially rasterizing the gradient including defining a clippath for the gradient 202. In one implementation, the gradient is reduced to a combination of one or more simple objects (i.e., rectangles and parallelograms) and then an algorithm is invoked to identify the simple objects that bound the gradient. Methods and algorithms for reducing a gradient to simple objects and identifying bounding objects are known in the art. The clippath can be produced from the identified simple objects.

The clippath is converted to a high level representation 204. The high level representation of the clippath is appended to the page and identified as a knockout area that is not to be painted for the object 206.

In one implementation, the high level representation can be a path object where the path object is a PDF path object. The process of converting can include converting the clippath to a PDF path object. The step of adding the high level representation of the converted clippath can include adding a PDF path object identifying the knockout area to the PDF representation of the page.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

The processes described herein can be executed by a computer system. One such computer system includes a CPU, RAM, and an I/O controller coupled by a CPU bus. The I/O controller is also coupled by an I/O bus to input devices such as a keyboard and a mouse, and output devices such as a monitor.

A typical printer can be driven by the computer system. A printer embodying the invention includes an input/output (I/O) interface for receiving raster input over a cable or network from the host computer that outputs the raster data to the common bus. Error messages and control information relating to the transfer of data is communicated back to the host via the I/O interface. As the raster data is received, it is stored in random access memory (RAM) over the common bus. A microprocessor on the common bus provides the control for supplying the raster data to the print engine controller, which in turn passes the raster data to the electromechanical print engine that applies the image to paper.

The programs for the microprocessor can be permanently stored in a read-only memory (ROM). Input data and all other variable data can be stored in shared RAM.

A standard commercial microprocessor, such as the Motorola 68000 family or the Intel i960 family can be used as the microprocessor. The RAM is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. Moreover, each program is preferably implemented in a high level procedural or object-oriented programming language to communicate with a computer system. However, the programs can be implemented in assembly or machine language, if desired. In my case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A host-based method for identifying an area within a color layer of a page that is not to be painted when producing a final output page, the method comprising
    a. providing a page including a plurality of color layers, a first one of which includes a gradient;
    b. defining a clippath for the gradient;
    c. converting the clippath to a high level representation;
    d. adding the high level representation of the converted clippath back to the page into one or more other color layers different from the first color layer and identifying the high level representation as a knockout area that is not to be painted.

2. The method of claim 1 wherein the step of defining includes reducing the gradient to one or more simple objects and identifying a set of the simple objects that bound the gradient.

3. The method of claim 1 wherein the high level representation is a path object.

4. The method of claim 3 wherein the path object is a PDF path object.

5. The method of claim 1 wherein the step of converting includes converting the clippath to a PDF path object.

6. The method of claim 5 wherein the page is represented in PDF and the step of adding adds the PDF path object identifying the knockout area to the PDF representation of the page.

7. A host-based method for identifying an area within a color layer of a page that is not to be painted when producing a final output page, the method comprising:
    a. identifying an object within a page including a plurality of color layers that is to be overprinted and has a color definition that specifies color data for less than all of the color layers in the page;
    b. generating a knockout object associated with the identified object; and
    C. adding the knockout object to the page into at least one color layer for which the color definition of the object does not specify data.

8. The method of claim 7 wherein the page is a separated page and the knockout object is added to a location in a marking list for the separated page at a same location as the identified object in a marking list for the page.

9. The method of claim 7 wherein the step of appending the knockout object to the page appends the knockout object in a marking list for the page immediately after the identified object.

10. A host-based computer implemented method for identifying an area within a color layer of a page that is not to be painted when producing a final output page, the method including instructions for causing a computer to:
   a. provide a page including a plurality of color layers, a first one of which includes a gradient;
   b. define a clippath for the gradient;
   c. convert the clippath to a high level representation; and
   d. add the high level representation of the converted clippath back to the page into one or more other color layers different from the first color layer and identify the high level representation as a knockout area that is not to be painted.

11. The method of claim 10 wherein the high level representation is a path object.

12. The method of claim 11 wherein the path object is a PDF path object.

13. The method of claim 10 wherein the instruction for causing the computer to convert includes instructions to convert the clippath to a PDF path object.

14. The method of claim 13 wherein the page is represented in PDF and the instruction for causing the computer to add includes instructions to add the PDF path object identifying the knockout area to the PDF representation of the page.

15. A host-based computer implemented method for identifying an area within a color layer of a page that is not to be painted when producing a final output page, the method including instructions for causing the computer to:
   a. identify an object within a page including a plurality of color layers that is to be overprinted and has a color definition that specifies color data for less than all of the color layers in the page;
   b. generate a knockout object associated with the identified object; and
   c. append the knockout object to the page into at least one color layer for which the color definition of the object does not specify data.

16. The method of claim 15 wherein the method further comprises instructions to
   a. create color separations including generate a separation page for each color plane in the final output for the page; and
   b. add the knockout object to a location in a marking list for the separated page at a same location as the identified object is located in a marking list for the page.

17. The method of claim 15 further comprising instructions to append the knockout object in a marking list for the page immediately after the identified object.

18. The method of claim 15 further comprising instructions to append the knockout object in a marking list for the page immediately before the identified object.

* * * * *